P. B. MARFIELD.
FRICTION CLUTCH.
APPLICATION FILED APR. 5, 1909.
942,452.
Patented Dec. 7, 1909.
2 SHEETS—SHEET 1.
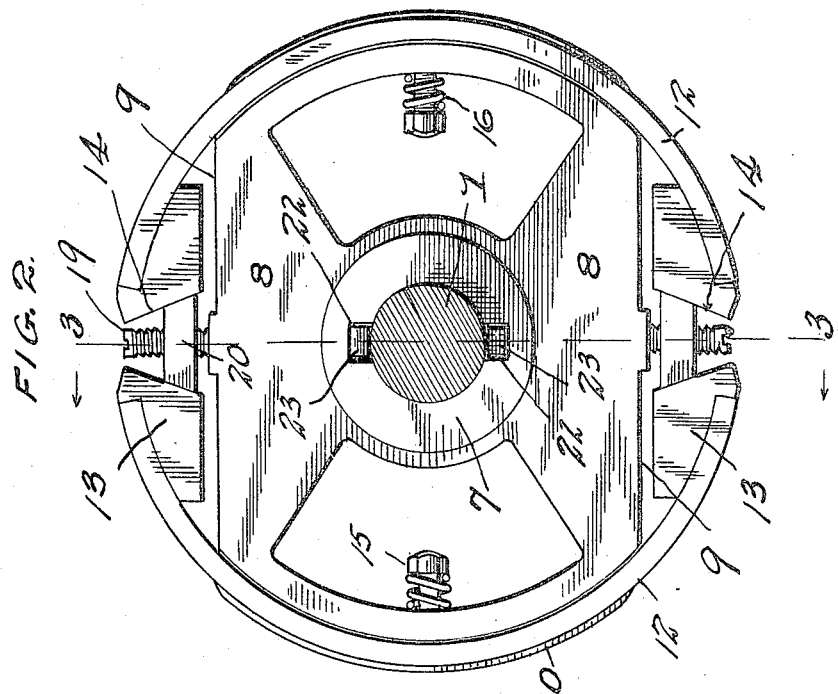
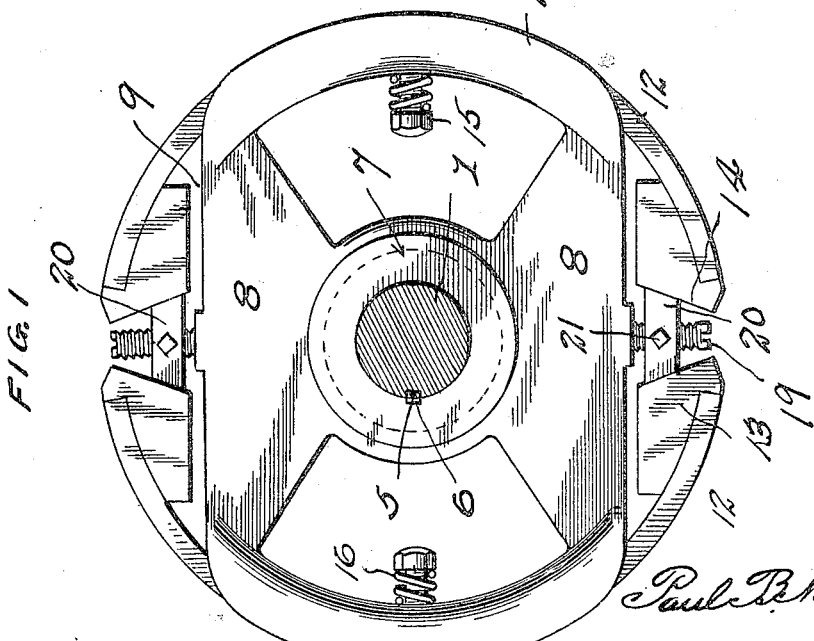
WITNESSES
C. K. Davis
M. E. Moore
Paul B. Marfield,
INVENTOR
By
Attorney

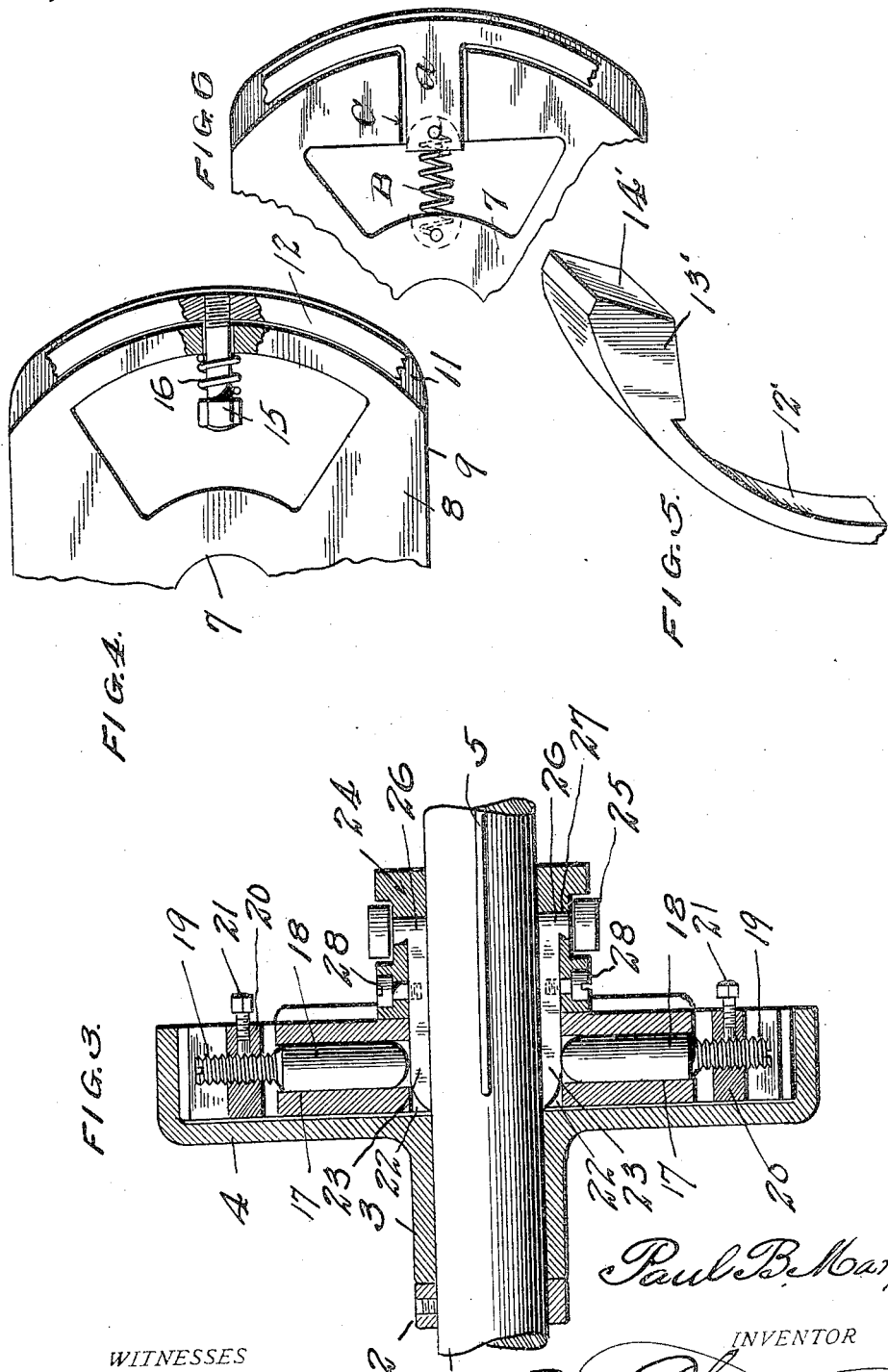

UNITED STATES PATENT OFFICE.

PAUL B. MARFIELD, OF CINCINNATI, OHIO, ASSIGNOR TO NUGENT TOOL COMPANY, OF CINCINNATI, OHIO.

FRICTION-CLUTCH.

942,452.   Specification of Letters Patent.   Patented Dec. 7, 1909.

Application filed April 5, 1909. Serial No. 487,882.

*To all whom it may concern:*

Be it known that I, PAUL B. MARFIELD, a citizen of the United States, residing at Cincinnati, in the county of Hamilton and State of Ohio, have invented certain new and useful Improvements in Friction-Clutches, of which the following is a specification.

My invention relates to improvements in friction clutches, and the leading object of my invention is the provision of a clutch of this type capable of application to many classes of machinery and which will be easily thrown into and out of operation and which will be absolutely reliable and efficient, which will be the embodiment of simplicity and durability, comprising few parts, which will be small and compact in size to occupy a small space and which in general will be practical in every particular.

To attain the desired ends, my invention consists of a friction clutch embodying novel features of construction and combination of parts for service substantially as disclosed herein.

In order that the details of construction and the operation of my clutch may be readily understood and its many advantages be fully appreciated I invite attention to the accompanying drawings.

Figure 1, represents an elevation taken from what may be termed the outside of the clutch mechanism. Fig. 2, represents a similar elevation taken from the inner side or face of the clutch mechanism. Fig. 3, represents a vertical sectional view taken on the line 3—3 of Fig. 2. Figs. 4 and 5, and 6 represent detailed views of parts of the clutch mechanism.

Referring by numerals to the drawings in which similar numerals of reference are employed to designate similar parts in the several views: the numeral 1 designates the driving shaft upon which is secured the collar 2, providing a stop or abutment for the sleeve 3 of the shell pulley 4, mounted loosely upon the driving shaft.

Being fast on the driving shaft by reason of the key 5 set in the shaft and the channel or keyway 6 is the hub 7, said hub being provided with a pair of extensions 8 having the parallel flat faces 9, and formed with the curved or segmental rims 10, each providing a curved pocket or recess 11. In the said curved recesses or pockets is seated the pair of curved springs 12 having each at their free end a head 13, said heads each having an inclined bearing face 14. From this construction it will be observed that the pair of curved spring members are seated in the recesses provided upon the arms of the hub, and to secure the springs in proper relation I employ the pair of headed screws 15, around which are placed the spiral springs 16 which exert their tension to hold the spring members in proper relation.

Mounted in radial sockets 17 of the arms of the hub are the plungers 18, formed at their outer ends with screws 19 fitting in wedge-shaped expanding blocks 20, said expanding blocks being adjustable upon said screws and retained in the proper adjustment by means of the binding screws 21, and the wedge-shaped expanding blocks are located between the heads 13, and bear at all times upon said heads.

The hub is provided with a pair of channels 22, directly under and in line with the plungers 18, and in operation the pair of lateral arms 23, mounted within the shifting collar 24, operated by the shifter 25, when said shifting collar is moved inward causes the pair of arms to engage the inner ends of the plungers, force said plungers upward or outward causing the wedge-shaped expanding blocks to ride on the inclined faces of the heads and force the springs outward against or in frictional contact with the inner face of the shell pulley and thus cause the pulley to rotate with the shaft, and to release the shell pulley from the clutch it is simply necessary to shift or move the shifting collar away from the hub and the springs will release their frictional contact with the inner face of pulley.

The arms carried by the shifting collar are secured in proper relation to collar by screws 28. Also if desired instead of attaching the bearing head 13 to the springs 12 I may use the construction shown in Fig. 5 in which the spring 12′ is formed with the head 13′ having the inclined bearing face 14′, and this construction may be used if desired as it will perform its functions in a thoroughly efficient manner. Also if desired instead of being made with a pair of headed screws 15, around which are placed the spiral springs 16, the springs may be constructed with lugs A fitting into the slots C in the outer rim of the hub as shown in Fig. 6, and when so constructed will be held in proper relation by tension springs B, which are attached to lug A at one end and to the hub at the other end of said extension springs.

It is evident from the foregoing that I provide a friction clutch which can be instantly thrown into or out of operation, which will positively perform the function for which it is designed and will be never failing in action, is composed of few parts insuring compactness, durability and inexpensiveness of production, and that from every point of view the clutch is entirely practical.

I claim:

1. In a friction clutch, the combination with the shaft, a shell pulley loosely mounted thereon, a hub on the shaft formed with a series of radially disposed openings, mechanism carried by a groove in the hub and adapted to be expanded to engage the shell pulley, means passed through certain of said radial openings and held in position by springs engaging the same and the hub, said means serving to hold the expanding mechanism in position, plungers mounted in the other radial openings, and means mounted on the shaft for operating said mechanism by the outward propulsion of said plungers.

2. In a friction clutch, the combination of a shaft, a shell pulley rotatable upon the shaft, a hub made fast upon the shaft, springs loosely carried by the hub and adapted to be expanded to engage the shell pulley, plungers mounted in radial holes in the hub and constructed to expand the springs against the shell pulley by direct wedging action against the springs, and a shifting collar carrying wedging means to operate said plungers by forcing them outward.

3. In a friction clutch, the combination of a shaft, a rotatable member on said shaft, a hub made fast to the shaft, a pair of springs mounted in the hub and held in place by springs having engagement with the hub and with means passing through the rim thereof, said springs being adapted to be expanded to frictionally engage the said rotatable member, and radially movable means on the hub for engaging said springs to cause said frictional engagement.

4. In a friction clutch, the combination of a shaft, a rotatable member thereon, a hub made fast on the shaft and formed with a pair of flat faced extensions and a pair of curved rims providing pockets, a pair of springs fitted in said pockets and formed with bearing heads, means for retaining the springs in place in the pockets, a pair of plungers mounted in radial holes in the arms of the hub, a shifting collar provided with two feather keys with wedge shaped ends for engaging and forcing outward the plungers and blocks carried by the plungers, each block having two sloping faces with an angle adapted to expand the friction springs by contact with the bearing heads on end of said springs, when plungers are forced outward, and thereby causing frictional contact of said springs with the rotatable member.

In testimony whereof I affix my signature, in presence of two witnesses.

PAUL B. MARFIELD.

Witnesses:
EDNA GERWE,
MOLLIE HETTESHEIMER.